(12) United States Patent
Wurtz

(10) Patent No.: US 8,052,020 B1
(45) Date of Patent: Nov. 8, 2011

(54) FISHERMAN'S CADDY APPARATUS

(76) Inventor: Derek W. Wurtz, Provo, UT (US)

( * ) Notice: Subject to any disclaimer, the term of this patent is extended or adjusted under 35 U.S.C. 154(b) by 421 days.

(21) Appl. No.: 12/474,054

(22) Filed: May 28, 2009

(51) Int. Cl.
*A01K 97/10* (2006.01)
*A45K 5/00* (2006.01)

(52) U.S. Cl. ........ 224/662; 224/920; 224/922; 224/676; 224/680; 224/681; 43/21.2; 43/54.1; 43/57.1

(58) Field of Classification Search .................. 224/662, 224/676, 922, 103, 907, 642, 920, 200, 680, 224/681; 43/54.1, 57.1, 25.2, 21.2; D22/139, D22/136, 147, 148; 206/315.11
See application file for complete search history.

(56) References Cited

U.S. PATENT DOCUMENTS

| | | | |
|---|---|---|---|
| 4,151,938 A | | 5/1979 | Barker et al. |
| 4,529,112 A | * | 7/1985 | Miller ............................ 224/610 |
| 4,817,323 A | | 4/1989 | Braid |
| 4,828,152 A | | 5/1989 | Pepping |
| 4,871,099 A | * | 10/1989 | Bogar, Jr. ........................ 224/566 |
| D362,753 S | * | 10/1995 | Bland ............................ D3/260 |
| 5,619,819 A | | 4/1997 | Hauschild |
| 5,632,113 A | * | 5/1997 | Raymond et al. ............... 43/54.1 |
| 5,893,502 A | | 4/1999 | Redzisz |
| 5,893,504 A | * | 4/1999 | Baronian et al. .............. 224/656 |
| 5,953,846 A | | 9/1999 | Shelton |
| 6,036,067 A | * | 3/2000 | Alcorn .......................... 224/153 |
| 6,267,276 B1 | | 7/2001 | Cook |
| 6,382,490 B1 | * | 5/2002 | Divincenzo .................... 224/681 |
| 7,051,471 B1 | * | 5/2006 | Ausborne, Jr. .................. 43/54.1 |
| 2002/0166281 A1 | * | 11/2002 | Broberg ......................... 43/21.2 |
| 2005/0077331 A1 | * | 4/2005 | Keller et al. .................. 224/161 |
| 2005/0092802 A1 | * | 5/2005 | Maley ........................... 224/628 |
| 2007/0108248 A1 | * | 5/2007 | Hoffmeier et al. ............. 224/650 |

* cited by examiner

*Primary Examiner* — Nathan J Newhouse
*Assistant Examiner* — Matthew Theis
(74) *Attorney, Agent, or Firm* — Crossley Patent Law; Mark A. Crossley

(57) ABSTRACT

The pliable fisherman's caddy apparatus provides hands free carry of fishing equipment. Additionally, hands free carry of two fishing poles is provided. The apparatus is worn by the provided waist belt by a user, much like a fanny pack. Absolutely no impingement on a wearer's torso, arm movements, or leg movements are in any way experienced. Quick movement of the case from back to front, on a wearer, is as easy as spinning the belt. As the fisherman's caddy apparatus is lightweight, and waist worn, a user does not experience any balance issues when negotiating varied terrain.

4 Claims, 3 Drawing Sheets

US 8,052,020 B1

FISHERMAN'S CADDY APPARATUS

BACKGROUND OF THE INVENTION

There exist a host of items for a fisherman to carry and keep up with in some attempted organized fashion. Add to this that many fishermen meander along coastlines, streams, through water, and over rocks in their quests for ideal access, and carry these items. Fishermen often also carry more than one pole, which adds to the difficulty. Also, attempting to carry such items over difficult terrain can be very dangerous. What has been needed is a hands free means for carrying many necessary items, including two poles. The present apparatus provides this advantage in a comfortable compact device that allows more mobility than any previously provided.

FIELD OF THE INVENTION

The fisherman's caddy apparatus relates to tackle boxes and fishing pole supports and more especially to an apparatus that provides hands free carry of tackle and two poles, with no impingement on a fisherman's movement, limbs, or torso.

SUMMARY OF THE INVENTION

The general purpose of the fisherman's caddy apparatus, described subsequently in greater detail, is to provide a fisherman's caddy apparatus which has many novel features that result in an improved fisherman's caddy apparatus which is not anticipated, rendered obvious, suggested, or even implied by prior art, either alone or in combination thereof.

To attain this, the fisherman's caddy apparatus is provided in two embodiments, with the pliable embodiment being ideal for most. However, a rigid embodiment is optionally available for those who so choose. The apparatus provides hands free carry of fishing equipment. Additionally, hands free carry of two fishing poles is provided. The apparatus is worn by the provided waist belt by a user, much like a fanny pack. Absolutely no impingement on a wearer's torso, arm movements, or leg movements are in any way experienced.

Quick and easy movement of the case from back to front, on a wearer, is as easy as spinning the belt. As the fisherman's caddy apparatus is lightweight, and waist worn, a user does not experience any balance issues when negotiating varied terrain.

Thus has been broadly outlined the more important features of the improved fisherman's caddy apparatus so that the detailed description thereof that follows may be better understood and in order that the present contribution to the art may be better appreciated.

An object of the fisherman's caddy apparatus is to provide hands free carry of fishing equipment.

Another object of the fisherman's caddy apparatus is to provide hands free carry of two fishing poles.

A further object of the fisherman's caddy apparatus is to be worn by the waist belt.

An added object of the fisherman's caddy apparatus is to not impinge on a wearer's torso, arm movements, or leg movements in any way.

And, an object of the fisherman's caddy apparatus is to provide for quick and easy movement of the case from back to front on a wearer.

Yet another object of the fisherman's caddy apparatus is to be lightweight.

Still another object of the fisherman's caddy apparatus is to be optionally pliable.

A further object of the fisherman's caddy apparatus is to be optionally rigid.

These together with additional objects, features and advantages of the improved fisherman's caddy apparatus will be readily apparent to those of ordinary skill in the art upon reading the following detailed description of presently preferred, but nonetheless illustrative, embodiments of the improved fisherman's caddy apparatus when taken in conjunction with the accompanying drawings.

In this respect, before explaining the current embodiments of the improved fisherman's caddy apparatus in detail, it is to be understood that the fisherman's caddy apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved fisherman's caddy apparatus. It is therefore important that the claims be regarded as including such equivalent constructions insofar as they do not depart from the spirit and scope of the fisherman's caddy apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the fisherman's caddy apparatus generally designated by the reference number 10 will be described.

Figure 1:
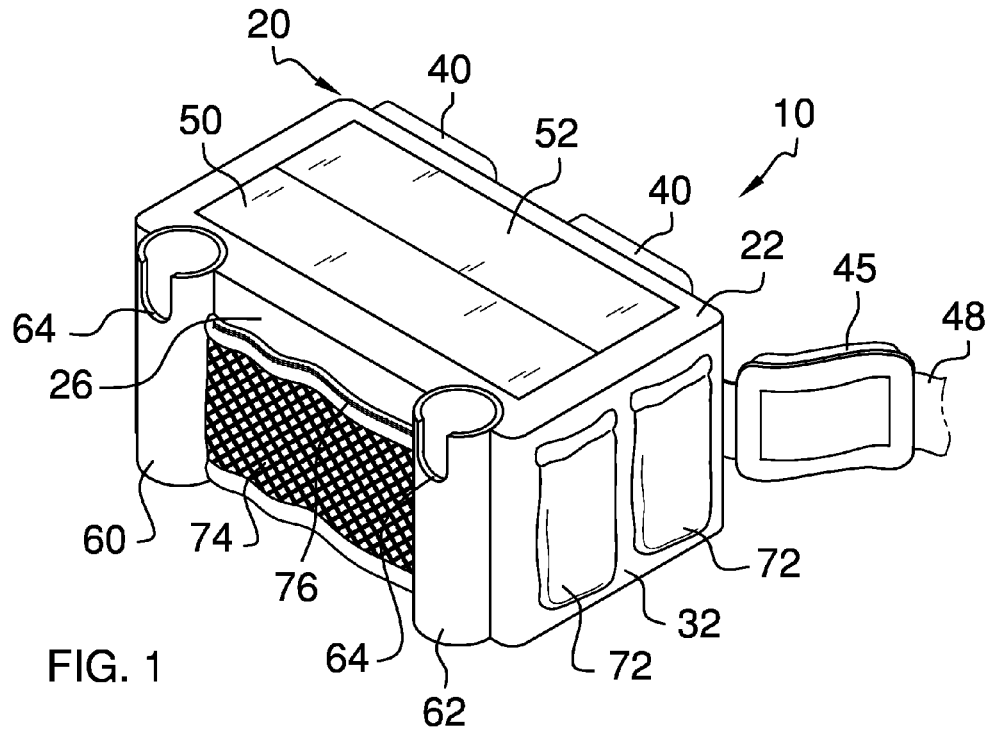
FIG. 1 is a frontal and top perspective view.
Figure 2:
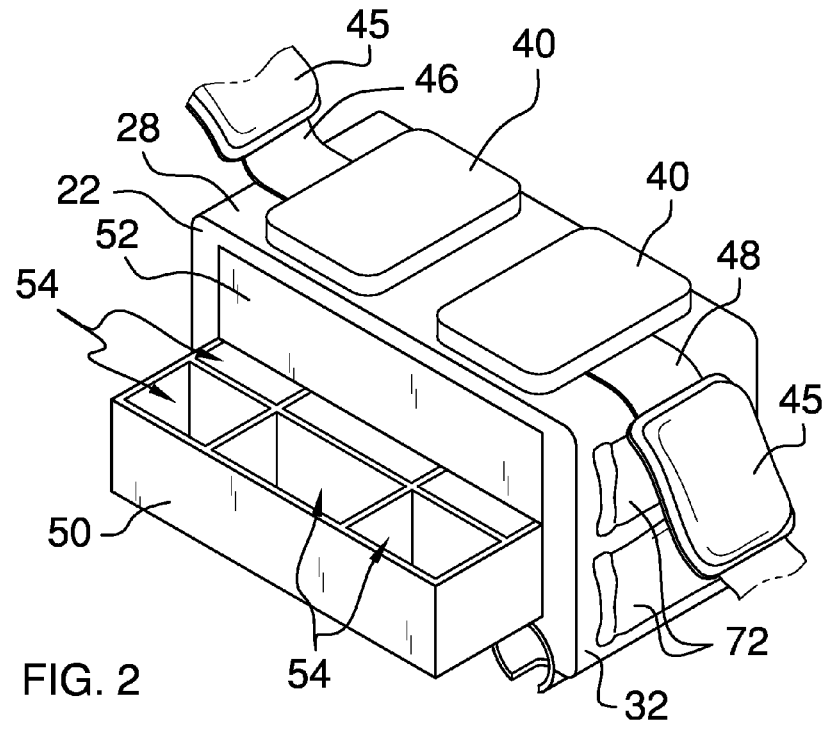
FIG. 2 is a back and top perspective view.

Referring to FIGS. 1 and 2, the apparatus 10 has a pliable case 20 having a top 22 spaced apart from a bottom 24, a front 26 spaced apart from a back 28, and a first end 30 (not shown) spaced apart from a second end 32. The pair of spaced apart vertically disposed pole cylinders embedded in the front 26 comprises the first pole cylinder 60 and the second pole cylinder 62. A cutout 64 is disposed in a top outer edge of each pole cylinder to accommodate fishing pole 12 hardware. The mesh pocket 74 is disposed on the front 26 between the pole carriers and is opened via the zipper 76. The pair of identical spaced apart end pockets 72 is disposed on the second end 32. The pair of identical storage trays are disposed adjacent to each other in the top 22 and comprise the first storage tray 50 and the second storage tray 52. Each storage tray is equipped with a plurality of divided compartments 54.

Figure 4:
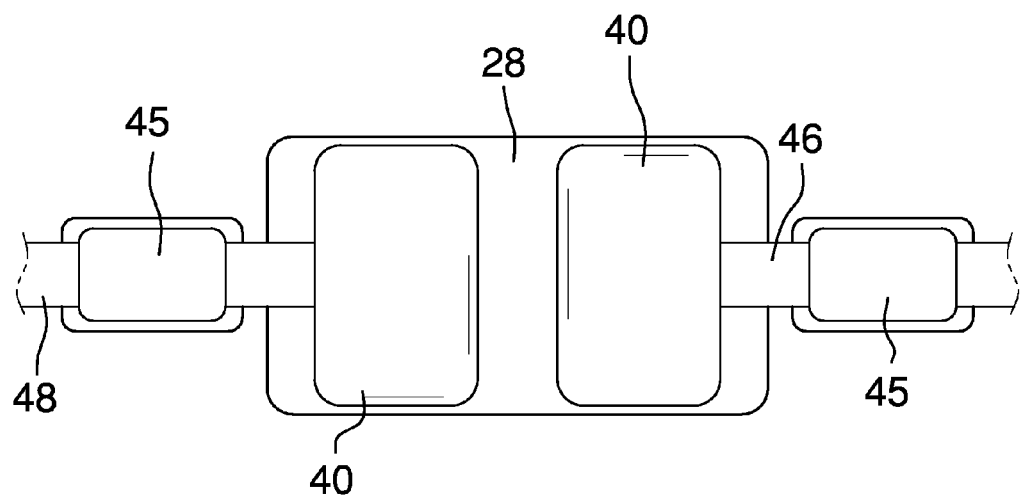
FIG. 4 is a back elevation view.

Referring to FIG. 4, the pair of identical spaced apart case pads 40 is disposed on the case 20 back 28. The pair of straps is extended from the case 20 back 28. The straps partially comprise the first strap 46 extended toward and beyond the case 20 first end 30. The second strap 48 is extended toward and beyond the case 20 second end 32. Each strap is extended from below one of the case pads 40 so that a wearer experiences utmost comfort. Each strap is removably strapped to the other around a user's waist. At least one strap pad 45 is disposed around each strap.

Figure 3:
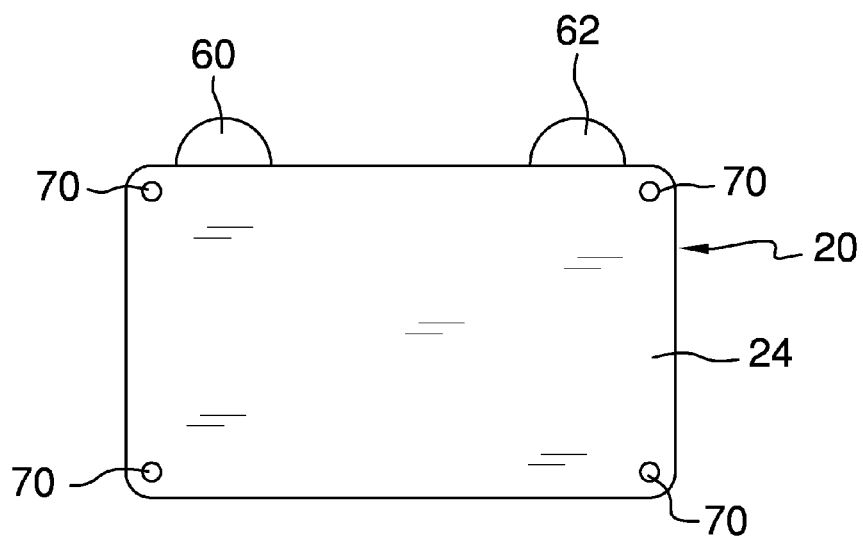
FIG. 3 is a bottom plan view.

Referring to FIG. 3, a plurality of holes 70 is disposed in the case 20 bottom 24. Holes 70 can perform more than one function. Holes 70 provide case 20 drainage. Holes 70 can also provide for various hardware devices to anchor the apparatus 10 to an object or to the ground.

Figure 5:
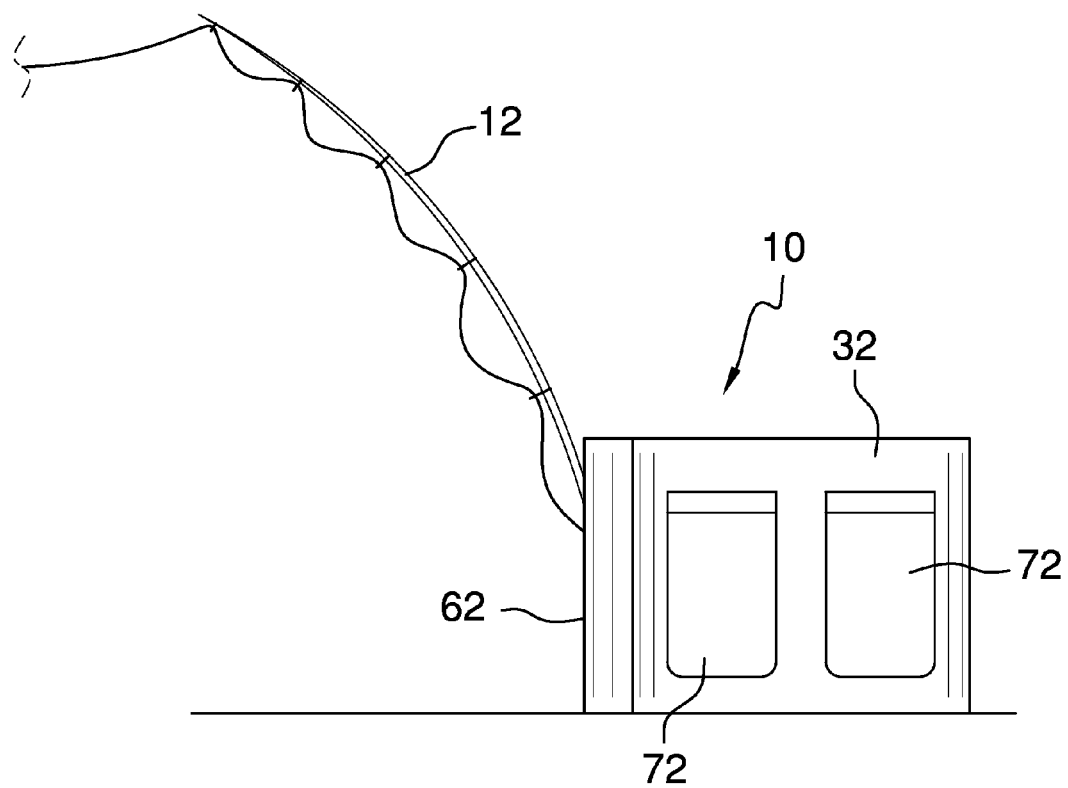
FIG. 5 is a second end elevation view, with one fishing pole inserted into a pole cylinder.

Referring to FIG. 5, the apparatus 10 supports a fishing pole 12 fitted into the second pole cylinder 62.

With respect to the above description then, it is to be realized that the optimum dimensional relationships for the parts of the fisherman's caddy apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the fisherman's caddy apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the fisherman's caddy apparatus may be used.

Therefore, the foregoing is considered as illustrative only of the principles of the fisherman's caddy apparatus. Further, since numerous modifications and changes will readily occur to those skilled in the art, it is not desired to limit the fisherman's caddy apparatus to the exact construction and operation shown and described, and accordingly, all suitable modifications and equivalents may be resorted to, falling within the scope of the fisherman's caddy apparatus.

What is claimed is:

1. A fisherman's caddy apparatus, comprising, in combination:
   a pliable case having a top spaced apart from a bottom, a front spaced apart from a back, and a first end spaced apart from a second end;
   a pair of spaced apart vertical pole cylinders partially embedded in the front, comprising a first pole cylinder and a second pole cylinder;
   a cutout disposed in a top outer edge of each pole cylinder;
   a zipper-opened mesh pocket disposed on the front between the pole cylinders;
   a pair of identical spaced apart end pockets disposed on the second end;
   a pair of identical storage trays disposed adjacent to each other in the top, the storage trays comprising a first storage tray and a second storage tray;
   a plurality of divided compartments disposed in each storage tray;
   a pair of identical spaced apart case pads disposed on the case back;
   a pair of straps extended from the case back, the straps comprising a first strap extended toward and beyond the case first end, a second strap extended toward and beyond the case second end, each strap extended from below one of the case pads, each strap removably strapped to the other around a user's waist;
   at least one strap pad disposed around each strap.

2. The apparatus according to claim 1 further comprising a plurality of holes disposed in the case bottom.

3. A fisherman's caddy apparatus, comprising, in combination:
   a rigid case having a top spaced apart from a bottom, a front spaced apart from a back, and a first end spaced apart from a second end;
   a pair of spaced apart vertical pole cylinders partially embedded in the front, comprising a first pole cylinder and a second pole cylinder;
   a cutout disposed in a top outer edge of each pole cylinder;
   a zipper-opened mesh pocket disposed on the front between the pole cylinders;
   a pair of identical spaced apart end pockets disposed on the second end;
   a pair of identical storage trays disposed adjacent to each other in the top, the storage trays comprising a first storage tray and a second storage tray;
   a plurality of divided compartments disposed in each storage tray;
   a pair of identical spaced apart case pads disposed on the case back;
   a pair of straps extended from the case back, the straps comprising a first strap extended toward and beyond the case first end, a second strap extended toward and beyond the case second end, each strap extended from below one of the case pads, each strap removably strapped to the other around a user's waist;
   at least one strap pad disposed around each strap.

4. The apparatus according to claim 3 further comprising a plurality of holes disposed in the case bottom.

* * * * *